No. 771,419. PATENTED OCT. 4, 1904.
J. H. CONOVER.
ICE IMPLEMENT.
APPLICATION FILED DEC. 16, 1903.
NO MODEL.
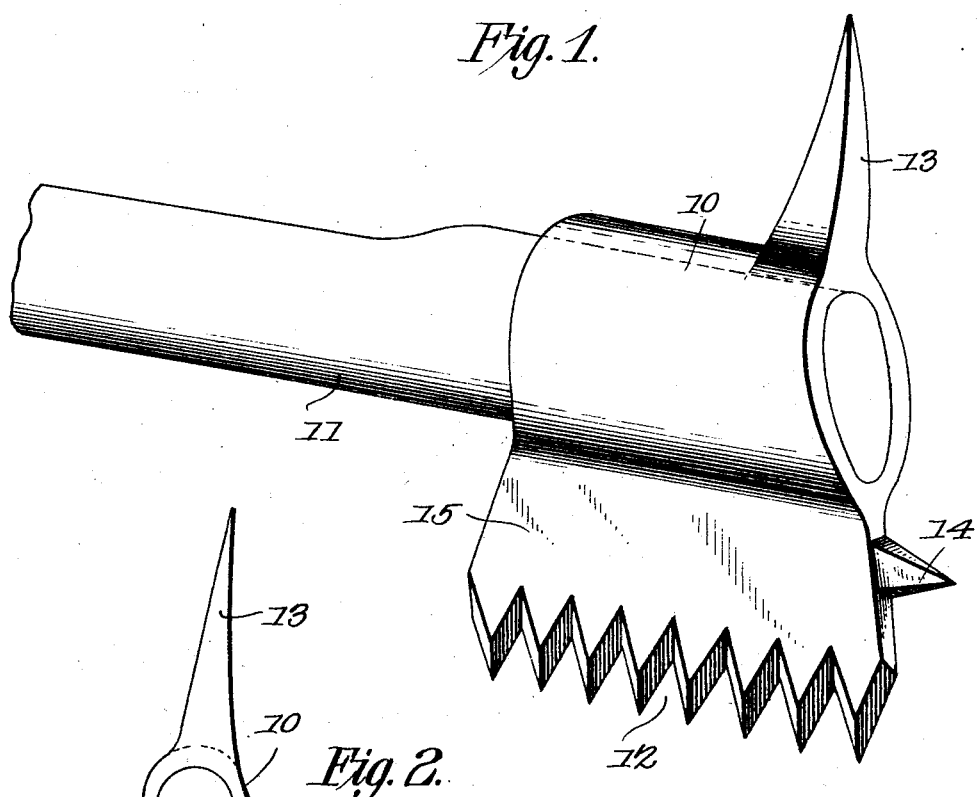
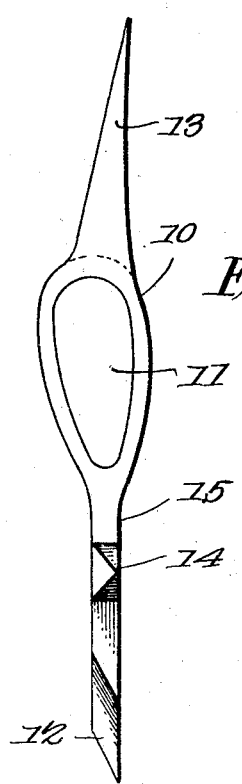
Witnesses
E. J. Stewart
C. N. Woodward
John H. Conover, Inventor.
by C. A. Snow & Co.
Attorneys No. 771,419.

Patented October 4, 1904.

UNITED STATES PATENT OFFICE.

JOHN H. CONOVER, OF PAWNEE CITY, NEBRASKA.

ICE IMPLEMENT.

SPECIFICATION forming part of Letters Patent No. 771,419, dated October 4, 1904.

Application filed December 16, 1903. Serial No. 185,436. (No model.)

*To all whom it may concern:*

Be it known that I, JOHN H. CONOVER, a citizen of the United States, residing at Pawnee City, in the county of Pawnee and State of Nebraska, have invented a new and useful Ice Implement, of which the following is a specification.

This invention relates to implements for handling ice and for similar purposes, and has for its object to produce a device of this character simple in construction, convenient to use, and by means of which blocks of ice may be quickly and economically handled and divided to any required extent; and the invention consists in certain novel features of form and construction, as hereinafter shown and described, and specified in the claims.

In the drawings illustrative of the invention, in which corresponding parts are denoted by like designating characters, Figure 1 is a perspective view of an ice implement embodying the features of the present invention. Fig. 2 is an end elevation of the improved implement.

The improved implement comprises a "head" 10, having a longitudinal aperture for a handle 11, preferably in the form of an ordinary ax-helve, and with one edge formed with a plurality of spaced angular teeth 12, similar to the teeth of an ordinary saw with the inclines all at one side, as shown. Protruding from the opposite side of the handle 11 is a prong 13, preferably slightly hook-shaped, and protruding from the outer edge is a spur 14, preferably inclined from one side, as shown. The head may be of any desired size, but for ordinary purposes will be about five inches long and with eight or more of the teeth 12; but these sizes and number of teeth may be varied to any extent, and I do not, therefore, wish to be limited in any manner thereby. The portion between the head 10 and the teeth 12, it will be noted, is in the form of a flat relatively thin blade 15, which not only lightens the implement, but materially reduces the resistance when employed as a hatchet or ax by giving an increased penetrating force by decreasing the resistance, as will be obvious. Then, again, by forming the blade of uniform thickness throughout the bevel or incline of the teeth 12 is not lessened by the grinding when the implement is sharpened, thus prolonging its "life." By this means also the small spur 14 is thinner and possesses a correspondingly-increased penetration. The implement therefore as a whole is formed with economy as to material and with increased efficiency without materially detracting from its strength or durability. The prong 13, it will also be noted by reference to Fig. 2, is inclined slightly to one side to bring its point into substantial alinement with the cutting edges of the teeth 12 and of the point of the spur 14. As proved by actual use, this peculiar arrangement of parts materially facilitates the handling and operation of the implement.

With an implement thus constructed when a block of ice is to be divided the toothed edge 12 is moved back and forth along the line of desired fracture to form a channel, and then a comparatively light blow will complete the division and without waste of ice, except the very small portion removed by the saw-like edge. Thus a cake of ice may be quickly divided into as many portions as desired and the time and labor required to accomplish this result very materially lessened and the waste of ice also very materially decreased.

The implement is designed more particularly for use in wagons employed in the retail trade, where a large number of different shapes and sizes of "blocks" of ice are required to fit different-sized refrigerators and ice-chests, and this implement will be found very advantageous for this purpose. The prong 13 will be found very convenient for drawing blocks toward the rear of the wagon, while the spur 14 will be equally as convenient for pushing the cakes or blocks toward the front of the wagon or handling them in similar manner in other localities.

Having thus described the invention, what I claim is—

1. The ice implement herein described having a head pierced for a handle and with a flat blade extending from one side and terminating in a plurality of spaced teeth with their cutting edges in alinement with one face of said blade and a prong protruding from the opposite side of said head with its point disposed in alinement with the cutting edges of said teeth and the face of the blade with which they are in alinement.

2. A device of the character described, comprising a head pierced to form an eye for a handle with a flat blade portion extending from one side of the eye and terminating in a plurality of saw-teeth having their cutting edges in alinement with one face of the blade, a prong projected from the opposite side of the eye, and a spur projected from the front edge of the blade, pointed portions of the prong and spur being disposed in alinement with the cutting edges of the saw-teeth and the face of the blade with which said cutting edges are alined.

In testimony that I claim the foregoing as my own I have hereto affixed my signature in the presence of two witnesses.

JOHN H. CONOVER.

Witnesses:
C. H. FULLER,
FRANK R. BARTON.